United States Patent [19]

Nooner

[11] 4,227,575

[45] Oct. 14, 1980

[54] RESERVOIR STABILIZATION BY TREATING WATER SENSITIVE CLAYS

[75] Inventor: Daryl W. Nooner, Houston, Tex.

[73] Assignee: Texaco Inc., White Plains, N.Y.

[21] Appl. No.: 920,881

[22] Filed: Jun. 30, 1978

[51] Int. Cl.² ............................................. E21B 43/24
[52] U.S. Cl. ..................................... 166/303; 166/288
[58] Field of Search ............... 166/272, 273, 274, 275, 166/288, 303, 305 R

[56] References Cited

U.S. PATENT DOCUMENTS

| | | | |
|---|---|---|---|
| 2,761,843 | 9/1956 | Brown ............................. | 252/8.55 D |
| 3,087,539 | 4/1963 | Maurer, Jr. ................ | 252/8.55 D X |
| 3,237,692 | 3/1966 | Wallace et al. ...................... | 166/303 |
| 3,347,313 | 10/1967 | Matthews et al. .................. | 166/272 |
| 3,360,043 | 12/1967 | Braden, Jr. et al. ................. | 166/272 |
| 3,444,931 | 5/1969 | Braden, Jr. ...................... | 166/305 R |
| 3,476,183 | 11/1969 | Haynes, Jr. et al. ............ | 166/275 X |
| 3,491,833 | 1/1970 | Braden, Jr. ............................ | 166/272 |
| 3,847,222 | 11/1974 | Braden, Jr. ....................... | 166/272 X |

*Primary Examiner*—Stephen J. Novosad
*Assistant Examiner*—George A. Suchfield
*Attorney, Agent, or Firm*—Carl G. Ries; Robert A. Kulason; James F. Young

[57] ABSTRACT

A method of treating subterranean formations containing water-sensitive montmorillonite clays by contacting the formation with an aqueous solution of nitrogen containing compounds at elevated temperatures whereby the montmorillonite is transformed into other clay minerals which are less sensitive to swelling when contacted with water.

3 Claims, No Drawings

RESERVOIR STABILIZATION BY TREATING WATER SENSITIVE CLAYS

FIELD OF THE INVENTION

This invention relates to an improved method for the treatment of clay-containing formations. More particularly, this invention relates to a method of treating subterranean formations containing water-sensitive montmorillonite clays by hydrothermal means to increase water permeability and to stabilize the clays contained therein.

DESCRIPTION OF THE PRIOR ART

In modern day production of hydrocarbons from subterranean formations, it has become fairly common practice to apply secondary recovery techniques to the hydrocarbon bearing formations to recover additional quantities of hydrocarbons therefrom. Among the methods employed in secondary recovery operations are those involving water, steam or gas flooding or combinations thereof. One of the more serious problems encountered in secondary recovery operations with water or hydrothermal procedures, such as steam flooding, is that an underground hydrocarbon-bearing formation also may contain clay or claylike bodies which swell or disperse on contact with water. In particular, the presence of hydratable clays, such as montmorillonite, often results in substantial decreases in permeability when water comes into contact with the formation. Thus, the secondary recovery processes involving treatment of such a formation with water or low quality steam generally result in swelling of the clays by adsorption of the water with the concomitant result that the permeability of the formation is materially decreased. The decrease in the permeability of the formation to water results in the reduction of the amount of hydrocarbon which may be recovered therefrom by means of the secondary recovery procedure.

Many techniques for stabilizing water-sensitive formations have been devised which involve minimizing total interparticle swelling by the introduction of exchange cations such as calcium. Other techniques involve the use of organic cations, such as guanidine hydrochloride, which are adsorbed on the clay thereby preventing hydration and swelling. However, the use of both organic and inorganic materials, which depend for success upon the exchange capacity of the clays are limited by the fact that the mineralogical structure of the water-sensitive clays is not altered and hence the stabilization is not truly irreversible, especially at higher temperatures.

More recently, the effects on the mineralogy of formation matrices of hydrothermal treatments, such as steam flooding, have been reported. For example, in formations containing quartz, nonexpandable clays, such as kaolinite, and traces of carbonate minerals, hydrothermal treatments may dissolve a portion of these minerals and convert a further portion into a new expandable form of clay mineral known as montmorillonite. This new, synthesized montmorillonite, owing to its water adsorption and swelling properties, is expandable and thereby causes a decrease in permeability and porosity of the formation, with a resultant decrease in hydrocarbon production from the formation. Since the majority of hydrocarbon-bearing formations contain minerals which are capable of such montmorillonite synthesis, the inhibition of these undesirable reactions is important when considering hydrothermal processes in secondary recovery.

The U.S. Pat. No. 3,384,177, to Day et al, discloses a method whereby the transformation of kaolinitic clays into water-sensitive montmorillonite can be inhibited through the use of ammonium hydroxide in clay containing sandstones. This patent teaches that the montmorillonite can be converted into a nonexpandable clay when subjected to an ammonia treatment at elevated temperatures, which thereby minimizes adverse swelling during subsequent contact of the formation with aqueous media.

U.S. Pat. No. 3,543,858 discloses a method for transforming montmorillonite to nonexpanding illitic and lesser expanding mixed layer clays by treating the formation with a heated aqueous solution of potassium chloride. In this way, the montmorillonite can be rendered insensitive to aqueous media by transforming, irreversibly its mineralogical structure.

SUMMARY OF THE INVENTION

This invention provides a method of mineralogically transforming a formation matrix by injecting thereinto an aqueous solution of nitrogen containing compounds at elevated temperatures, continuing the injection until the formation is heated to an elevated temperature for a desired length of time when stabilization of the formation is effected to a desired radial distance from the well bore.

DESCRIPTION OF THE INVENTION

With the method of this invention, clay-containing formations are effectively transformed to stabilize their swelling upon subsequent exposure to aqueous media, such as water, hot water, or steam. The method has utility as a pretreatment operation for any operation, such as well stimulation or secondary recovery, wherein a hydrothermal treatment is to be undertaken. For example, a subsequent steam flooding operation, by means well known in the art, may be accomplished without the normally associated clay swelling and/or dispersion. Such pretreatment permits more effective recovery of the hydrocarbons contained in the formation, since blocking and plugging of the formation by the flooding fluid is precluded or retarded, thereby allowing the easier penetration of the formation by the flooding fluids.

The invention herein disclosed provides an improved method for the stabilization of subterranean formations. Exposure of the formation to temperatures of from about 260° C. to about 310° C. and an aqueous solution of a nitrogen containing compound having a concentration of about 0.5 N to about 3.0 N produces a transformation of the water-sensitive montmorillonite clays to a more stable illitic-type clay.

The following examples based on the results of tests are illustrative of the method of this invention. Mixtures consisting of 1.5 grams of dolomite, 1.5 grams of kaolinite and 1.5 grams of quartz sand were ground to pass a 200 mesh screen. Portions of these mixtures were then placed in stainless steel bombs and thereafter a treating solution was added. The treating solutions used were 100 ml of 0.5 M guanidine hydrochloride, 0.5 M guanidine carbonate, 0.5 M guanidine acetate, 0.5 M urea or 0.5 M formamide in distilled water.

The bombs were sealed and then maintained at a given temperature for a given period of time after which the solid products were analyzed for mineral composition by X-ray diffraction. The results from these tests are given in Table I, wherein the mineralogical analysis, in percent by weight, is given for the samples before and after treatment.

The results demonstrate that treatment with guanidine hydrochloride, guanidine carbonate, guanidine acetate, urea and formamide at 300° C. for seven days caused transformation of the swelling clay (montmorillonite) to non-swelling clay (illite) and lesser swelling clays (mixed-layer).

It has been demonstrated that an aqueous solution of particular amides or amidines transforms the montmorillonite to illitic and mixed-layer clays upon hydrothermal treatment. Thus, there has been shown an improved method of treating a subterranean hydrocarbon-bearing formation by hydrothermal means in order to stabilize the water-sensitive clays therein.

Other modifications and variations, as hereinbefore set forth, may be made without departing from the spirit and scope thereof, and therefore only such limitations should be imposed as are indicated in the appended claims.

TABLE

| Treating Solution | TIME (days) | TEMP (°C.) | CONDITIONS | MINERALOGICAL ANALYSIS, PERCENT BY WEIGHT ||||||||
|---|---|---|---|---|---|---|---|---|---|---|---|
| | | | | Q | M | I | K | C | D | F | A |
| 0.5 M guanidine hydrochloride | 7 | 300 | Before | 50 | 50 | | | | | | |
| | | | After | 23 | 25 | 17 | 4 | 31 | — | — | — |
| 0.5 guanidine carbonate | 7 | 300 | Before | 50 | 50 | | | | | | |
| | | | After | 35 | 8 | 22 | — | 29 | — | — | 6 |
| 0.5 M urea | 7 | 300 | Before | 50 | 50 | | | | | | |
| | | | After | 23 | 12 | 22 | — | 27 | — | — | 16 |
| 0.5 M Formamide | 7 | 300 | Before | 50 | 50 | | | | | | |
| | | | After | 28 | 33 | 9 | 9 | 21 | — | — | — |
| 0.5 M guanidine acetate | 7 | 300 | Before | 50 | 50 | | | | | | |
| | | | After | 24 | 12 | 24 | — | 27 | — | — | 13 |

Notes
Q = Quartz; M = Montmorillonite; I = Illite; K = Kaolinite; C = Calcite; D = Dolomite; F = Feldspar; A = Analcite.

I claim:

1. A method of altering the matrix of a hydrocarbon-bearing formation having present therein montmorillonite clays, comprising the steps of introducing into said formation via a wellbore penetrating said formation a heated aqueous solution of an amide selected from the group consisting of urea and formamide, continuing injection of said solution until said matrix is heated to a minimum temperature of about 260° C. for a desired radial distance from said wellbore, whereby said matrix is stabilized by mineralogically altering said montmorillonite clays.

2. A method as claimed in claim 1 wherein said amide is urea.

3. A method as claimed in claim 1 wherein said amide is formamide.

* * * * *